United States Patent [19]
Kazmark, Sr.

[11] 3,998,476
[45] Dec. 21, 1976

[54] PORTABLE LUGGAGE CARRIER WITH TELESCOPING HANDLE

[76] Inventor: Eugene Anthony Kazmark, Sr., 5 Remin Lane, Joliet, Ill. 60433

[22] Filed: Sept. 29, 1975

[21] Appl. No.: 617,868

[52] U.S. Cl. .................. 280/655; 280/47.37 R; 280/47.24; 403/108; 16/110 R
[51] Int. Cl.² ........................................ B62B 1/12
[58] Field of Search ............ 16/111 A, 111 R, 115, 16/110; 280/655, 47.37 R, 47.17, 47.24; 403/108, 109; 135/50

[56] References Cited
UNITED STATES PATENTS

| | | | |
|---|---|---|---|
| 2,474,722 | 6/1949 | Blume | 134/50 |
| 3,612,563 | 10/1971 | Kazmark, Sr. | 280/47.37 R X |
| 3,702,016 | 11/1972 | Keesee | 16/111 A |

*Primary Examiner*—Andrew V. Kundrat

[57] ABSTRACT

A wheeled portable luggage carrier is equipped with a telescoping handle assembly which is movable between extended and retracted positions. The handle assembly comprises a pair of telescoping tube assemblies, and each tube assembly includes lower, intermediate, and upper telescopingly related tubes. The lower ends of the intermediate and upper tubes carry lock buttons which can extend through openings in the upper ends of the lower and intermediate tubes, respectively, to releasably lock the tubes in an extended position. The lock buttons are released by a pair of upper and lower release bars which extend between the tube assemblies adjacent the upper ends of the lower tubes. The lower release bar is movable toward the upper release bar to force the lock buttons carried by the intermediate tubes inwardly, thereby unlocking the lower and intermediate tubes, and the lock buttons carried by the upper tubes are forced inwardly by the upper release bar as the intermediate tubes telescope downwardly within the lower tubes, thereby unlocking the intermediate and upper tubes.

10 Claims, 5 Drawing Figures

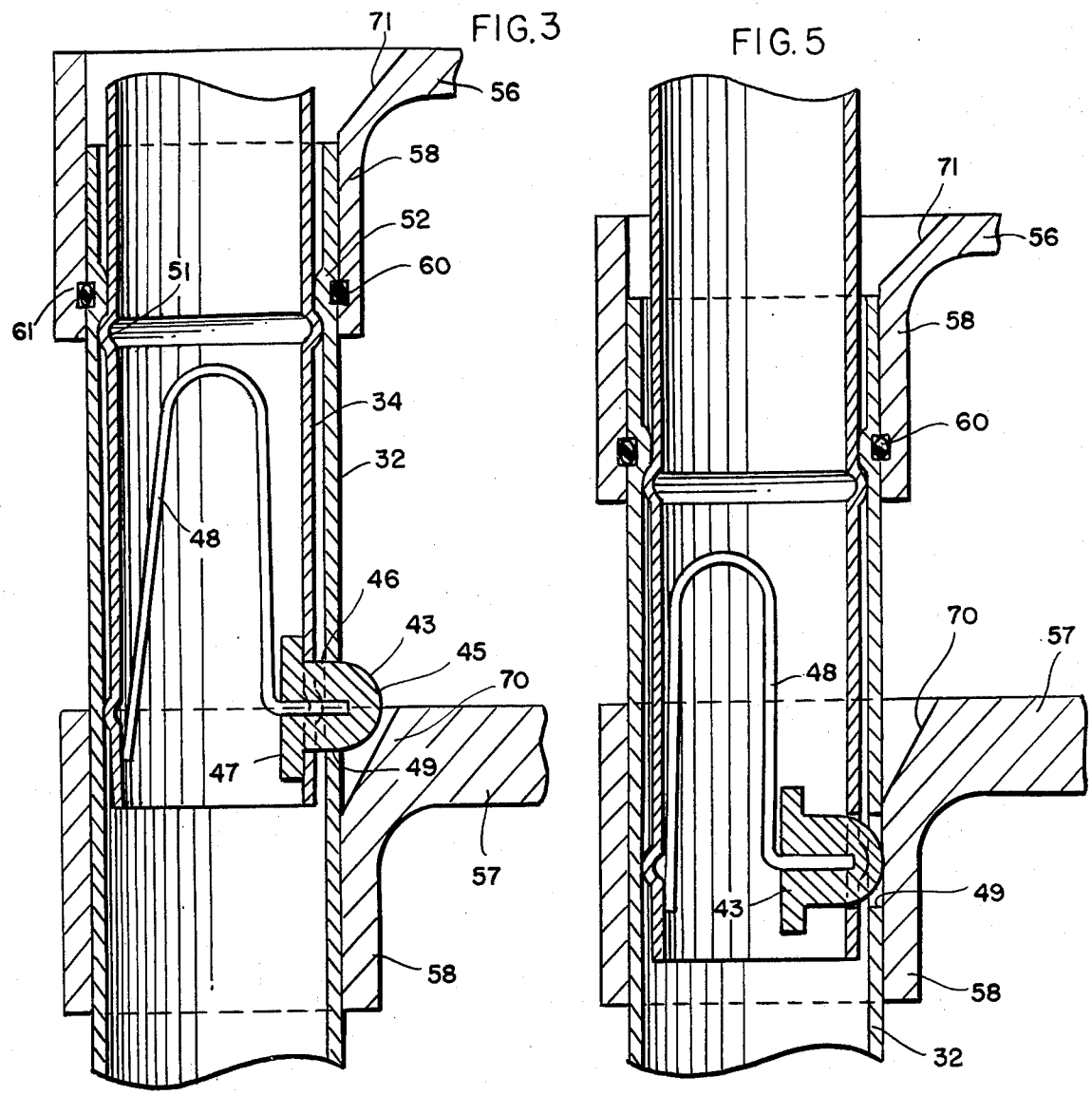
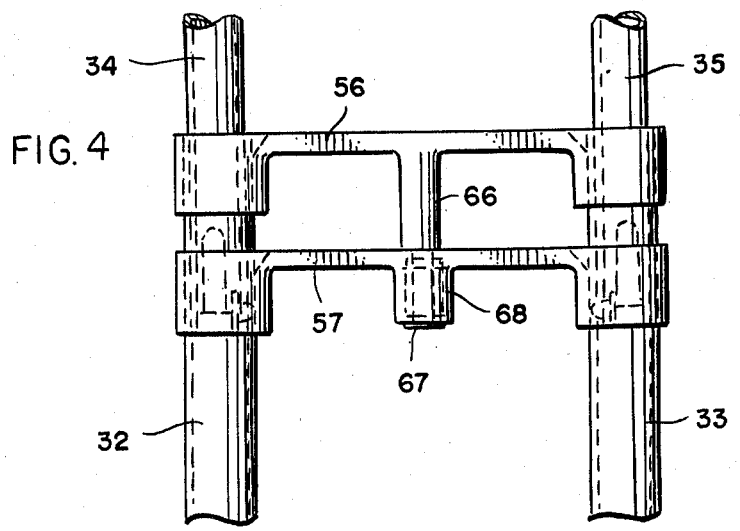

PORTABLE LUGGAGE CARRIER WITH TELESCOPING HANDLE

BACKGROUND AND SUMMARY

This invention relates to a portable luggage carrier, and, more particularly, to a portable luggage carrier which is provided with a telescoping handle which is movable between extended and retracted positions.

Portable luggage carriers of the type described in my U.S. Pat. No. 3,612,563 are quite useful for transporting suitcases and other luggage in airports, train stations, etc. Such carriers include a wheel-equipped base for supporting the luggage and a telescoping handle. The handle may be collapsed or retracted when the carrier is not being used to permit the carrier to be conveniently stored in the luggage or in its own carrying case.

The carrier shown in my prior patent has a single telescoping tube assembly, which is satisfactory for most uses. However, if an unusually heavy load is being carried, it is desirable to use a pair of spaced-apart tube assemblies to provide greater strength and stability. Further, the locking means for locking the telescoping tubes of my prior carrier were individually actuated. While this may be satisfactory for a single three-tube assembly which includes only two locking means, when a pair of three-tube assemblies having a total of four locking means are used, it is desirable that the locking means not have to be individually operated.

The invention provides a telescoping handle having a pair of tube assemblies in which the locking means can be quickly released and the tubes can be quickly and easily retracted and extended. The lower locking means are released simply by pulling the lower release bar toward the upper release bar, and the upper locking means are released automatically by the upper release bar as the intermediate and upper tubes are telescoped into the lower tube. The tubes are locked in their extended positions simply by pulling the tubes upwardly.

DESCRIPTION OF THE DRAWING

The invention will be explained in conjunction with an illustrative embodiment shown in the accompanying drawing, in which--

FIG. 3 is an enlarged fragmentary sectional view of the lower locking means in a locked position;

FIG. 4 is a fragmentary elevational view similar to FIG. 2 showing the lower release bar in its release position; and FIG. 5 is a fragmentary sectional view similar to FIG. 3 showing the lower release bar in its release position and the lower locking means in an unlocked position.

DESCRIPTION OF SPECIFIC EMBODIMENT

Figure 1:
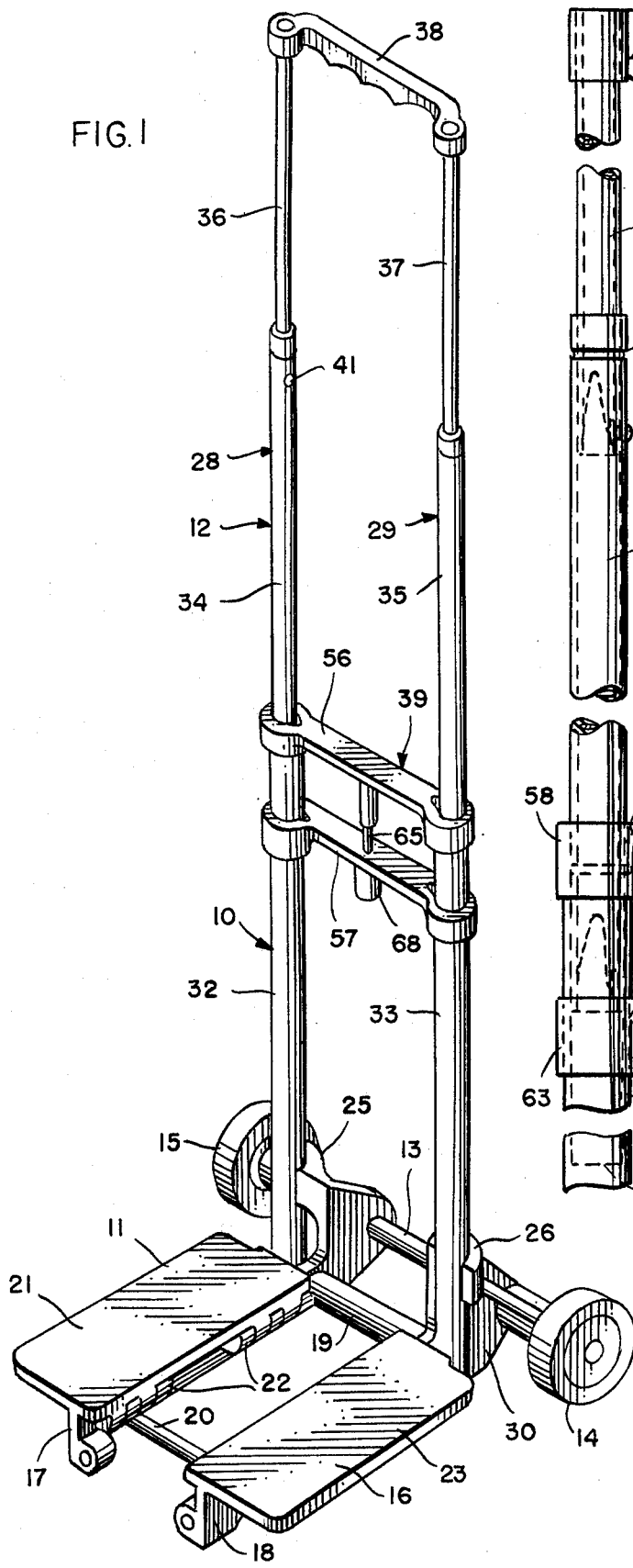
FIG. 1 is a perspective view of a luggage carrier equipped with a handle assembly formed in accordance with the invention.

Referring first to FIG. 1, the numeral 10 designates generally a portable luggage carrier which includes a base 11 and a handle assembly 12. The base 11 includes an axle 13 which rotatably supports a pair of wheels 14 and 15 and a luggage-supporting platform 16. The platform 16 includes a pair of spaced-apart arms 17 and 18 which are connected by a pair of transversely extending braces 19 and 20, and the rear end of each of the arms is rotatably mounted on the axle 13. A flat plate 21 is rotatably secured to the arm 17 by a pair of hinges 22, and a flat plate 23 is similarly hingedly secured to the arm 18. The arms 17 and 18 include curved stop finger portions 25 and 26, respectively, which are engageable with the handle assembly to prevent further counterclockwise movement of the arms beyond the position illustrated in FIG. 1 and to maintain the plates 21 and 23 in a position perpendicular to the handle assembly. The arms may be rotated clockwise, however, to bring the arms into a substantially parallel position with respect to the handle assembly, and the plates 21 and 23 can be rotated about their hinge connections to the arm so that they are positioned between the two tube assemblies of the handle assembly.

The handle assembly 12 includes right and left tube assemblies 28 and 29. The left tube assembly 29 is rotatably mounted on the axle 13 by an axle bracket 30 which is secured to the lower end of the tube assembly, and the right tube assembly 28 is secured to the axle by a similar axle bracket (not shown).

The right and left tube assemblies include lower tubes 32 and 33, respectively, intermediate tubes 34 and 35, respectively, and upper tubes 36 and 37, respectively. The intermediate tubes are telescopingly received by the lower tubes, and the upper tubes are telescopingly received by the intermediate tubes. The upper ends of the upper tubes are connected by a gripping handle 38, and the upper ends of the lower tubes are connected by a release bar assembly 39.

The upper tubes 36 and 37 are releasably locked in the extended position shown in FIG. 1 by locking buttons 41 and 42 (see also FIG. 2) which are carried by the upper tubes 36 and 37, respectively, and which extend through openings in the upper ends of the intermediate tubes 34 and 35. The intermediate tubes 34 and 35 are releasably locked in the extended position illustrated by locking buttons 43 and 44 which are carried by the intermediate tubes 34 and 35, respectively, and which extend through openings in the upper ends of the lower tubes 32 and 33.

An enlarged view of the locking button 43 is shown in FIG. 3, and the button includes a spherical or curved outer end portion 45, a generally cylindrical intermediate portion 46, and an enlarged base 47. The locking button is resiliently biased outwardly through an opening in the lower end of the intermediate tube 34 by a hairpin spring 48. When the intermediate tube 34 is in the extended position shown in FIG. 3, the locking button is aligned with an opening 49 in the upper end of the lower tube 32, and the spring 48 forces the button outwardly into the opening 49. The length of the cylindrical portion 46 of the button is such that the periphery of the opening 49 will engage the cylindrical portion when the base 47 abuts the inner surface of the tube 34. When the periphery of the opening 49 engages the cylindrical portion 46 of the locking button, the intermediate tube 34 and the lower tube 32 are locked against relative axial movement in either direction.

The locking buttons 41, 42, and 44 are similarly formed and are biased outwardly into their locking positions by hairpin springs similar to spring 48.

Still referring to FIG. 3, the intermeidate tube 34 is prevented from being completely withdrawn from the lower tube 32 by a radially outwardly extending circumferential rib or bead 51 which forms an outward projection on the outer surface of the tube 34 and which is engageable with an inwardly extending rib or bead 52 on the upper end of the lower tube 32 which forms an inwardly extending projection from the inner surface of the lower tube. The intermediate tube 34 is telescopeable downwardly within the lower tube 32 in the position illustrated in FIG. 3, but cannot be raised upwardly because of the engagement between the ribs 51 and 52.

The intermediate tube 35 is similarly prevented from being withdrawn from the lower tube 33, and the upper tubes 36 and 37 are prevented from being withdrawn from the intermediate tubes 34 and 35 by inwardly extending ribs 53 and 54 (FIG. 2) on the upper ends of the intermediate tubes which are engageable with outwardly extending ribs on the lower ends of the upper tubes 36 and 37.

The release bar assembly 39 includes upper and lower release bars 56 and 57 which extend between the right and left tube assemblies 28 and 29. The upper release bar 56 includes a pair of end collars 58 and 59 which are ensleeved over the upper ends of the lower tubes 32 and 33. Referring to FIG. 3, the collar 58 is secured against axial sliding movement along the tube 32 by a ring member 60 which is received within the annular recess formed by the rib 52 and an annular recess 61 in the collar. The collar 59 is similarly secured against axial sliding movement relative to the tube 33.

Figure 2:
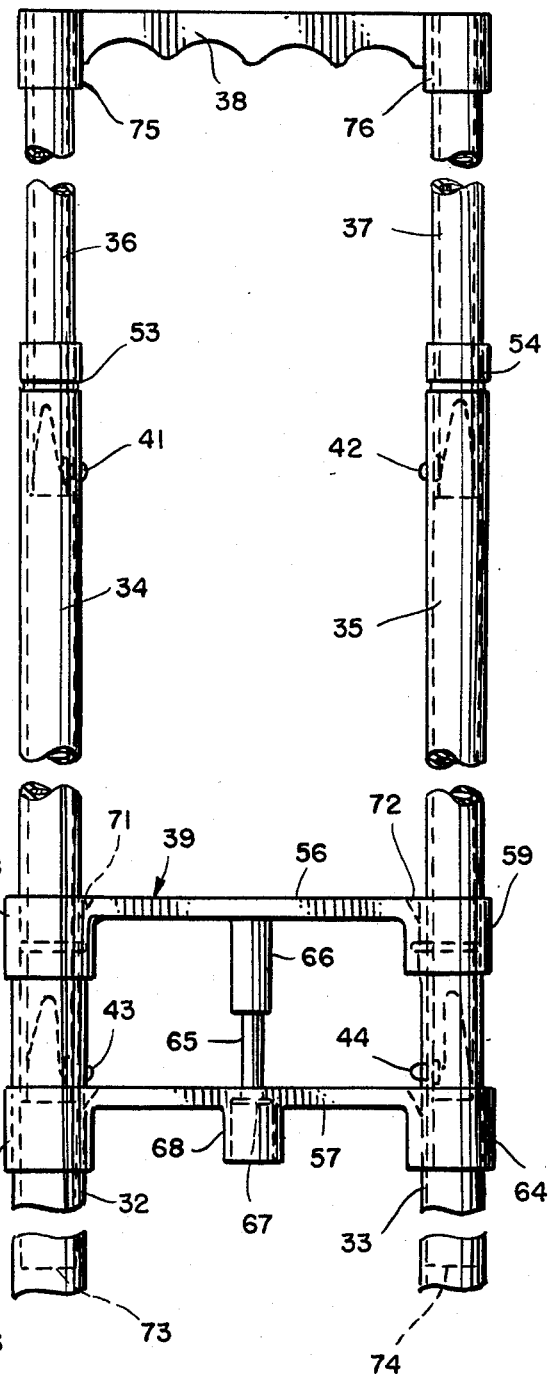
FIG. 2 is an enlarged fragmentary elevational view of the telescoping handle assembly.

The lower release bar 57 similarly includes collars 63 and 64 which are ensleeved on the tubes 32 and 33, respectively, but the collars 63 and 64 may slide freely over the tubes. The movement of the lower release bar 57 is guided and limited by a guide rod 65 which extends downwardly from a radially enlarged rod 66 which depends from the center of the upper release bar 56. The guide rod 65 extends through an opening in the lower release bar 57, and downward movement of the release bar 57 beyond the position illustrated in FIG. 2 is prevented by a radially enlarged head 67 on the lower end of the guide rod. A cylindrical sleeve 68 surrounds the head as the lower release bar is moved from its lower position illustrated in FIG. 2 to its raised position illustrated in FIG. 4.

FIGS. 1 and 2 illustrate the handle in the fully extended position. In this position, the upper tubes 36 and 37 are substantially completely withdrawn from the intermediate tubes 34 and 35 and are locked in position by the locking buttons 41 and 42. The intermediate tubes 34 and 35 are substantially completely withdrawn from the lower tubes 32 and 33 and are locked in position by the locking buttons 43 and 44. The lower release bar 57 is positioned just below the locking buttons 43 and 44.

Referring now to FIG. 3, the lower release bar 57 is provided with a inclined camming surface 70 below the locking button 43 and a similar inclined camming surface below the locking button 44. The locking buttons 43 and 44 can be pushed inwardly be raising the lower release bar 57 toward the upper release bar 56. This can be conveniently done by squeezing the lower release bar toward the upper release bar with one hand. As the lower release bar slides upwardly along the tubes 32 and 33 and the guide rod 65, the camming surface 70 pushes the locking button 43 inwardly against the outward bias of the spring 48 as shown in FIG. 5. The locking button 44 is similarly pushed inwardly by the associated camming surface. When the locking buttons 43 and 44 are in the position illustrated in FIG. 5, the intermediate tubes 34 and 35 can be telescoped downwardly within the tubes 32 and 33 merely by pressing downwardly on the grip 38. Although the outer end of the locking button 43 extends into the opening 49 in the tube 32, the spherical outer end of the button will permit the button to be cammed inwardly by the periphery of the opening as the locking button 43 moves downwardly.

As the intermediate tubes 34 and 35 move downwardly within the lower tubes 32 and 33 under the force exerted on the handle 38, the locking buttons 41 and 42 will eventually engage camming surfaces 71 and 72 (FIG. 2) in the stationary upper release bar 56. The camming surfaces 71 and 72 are similar to the camming surface 70 and will force the locking buttons 41 and 42 inwardly as the locking buttons move downwardly over the camming surfaces. The upper tubes 36 and 37 are then free to telescope downwardly within the intermediate tubes 34 and 35 under the force exerted on the grip 38.

The intermediate tubes 34 and 35 will telescope downwardly within the lower tubes until the lower ends of the intermediate tubes contact stops 73 and 74 (FIG. 2) in the lower ends of the lower tubes. The force exerted on the grip 38 will then serve to telescope the upper tubes 36 and 37 into the intermediate tubes 34 and 35 until the collars 75 and 76 of the gripping handle engage the upper ends of the intermediate tubes 34 and 35.

From the foregoing it will be appreciated that the handle can be moved from its extended position to a completely collapsed or retracted position in a simple two-step operation which can be performed quickly and easily. The operator need merely raise the lower release bar 57 toward the upper release bar 56 while exerting a downward force on the gripping handle 38. Upper movement of the lower release bar 57 releases the lower locking buttons 43 and 44 and permits the telescoping movement of the handle to begin. The locking buttons 41 and 42 will automatically be moved to an unlocking position by the upper release bar 56 as the locking buttons pass downwardly over the camming surfaces 71 and 72.

The cylindrical base 66 of the guide rod 65 acts as a stop against excessive upward movement of the lower release bar, and the weight of the lower release bar will return it to its position as soon as the bar is released.

The handle can be moved from a fully retracted position to the extended position of FIG. 1 merely by grasping the grip 38 and exerting an upward force. The upper tubes 36 and 37 will be withdrawn until the locking buttons 41 and 42 reach the openings in the intermediate tubes 34 and 35, and the upper tubes will then become locked relative to the intermediate tubes. Further upward movement of the grip 38 will raise the intermediate tubes from the lower tubes until the locking buttons 43 and 44 reach the openings in the lower tubes, and the intermediate tubes will then become locked relative to the lower tubes.

While in the foregoing specification a detailed description of a specific embodiment of the invention was set forth for the purpose of illustration, it is to be understood that many of the details hereingiven may be varied considerably by those skilled in the art without departing from the spirit and scope of the invention.

I claim:

1. A telescoping handle assembly for a portable luggage carrier having a wheel-equipped base, the handle assembly comprising a pair of spaced-apart parallel tube assemblies, each of the tube assemblies having upper and lower ends, the lower ends being attached to the base and extending upwardly therefrom, a handle extending between the upper ends of the tube assemblies and secured thereto, and a release bar assembly extending between the tube assemblies intermediate the ends thereof, each of the tube assemblies including a first tube extending upwardly from the base, a second tube telescopingly received by the first tube, and locking means carried by the lower end of the second tube for releasably locking the first and second tubes in an extended position, the first tube having an opening in the upper end thereof through which the locking means extends when the first and second tubes are in the extended position, the release bar assembly including a first bar extending between the first tube of each of the tube assemblies and secured thereto and a second bar extending between the first tube of each of the tube assemblies and slidably mounted thereon, the second bar being movable toward the first bar and having lock-engaging portions engageable with the locking means of the tube assemblies as the second bar moves toward the first bar whereby each of the locking means can be pushed inwardly through the opening in the first tube to release the first and second tubes and the second tube can telescope within the first tube.

2. The structure of claim 1 in which each of the locking means includes a rounded button which extends through the opening in the first tube when the tubes are in the extended position and spring means for resiliently biasing the button outwardly.

3. The structure of claim 1 in which each of the lock-engaging portions includes a cam surface for camming the lock means inwardly.

4. The structure of claim 1 including a guide rod secured to the first bar and extending toward the second bar, the rod being slidably received by the second bar, the second bar being movable along the guide rod as the second bar moves toward and away from the first bar.

5. A telescoping handle assembly for a portable luggage carrier having a wheel-equipped base, the handle assembly comprising a pair of spaced-apart parallel tube assemblies, each of the tube assemblies including a first tube extending upwardly from the base, a second tube telescopingly received by the first tube, a third tube telescopingly received by the second tube, first locking means carried by the lower end of the second tube for releasably locking the first and second tubes in an extended position, the first tube having an opening in the upper end thereof through which the locking means extends when the first and second tubes are in the extended position, and second locking means carried by the lower end of the third tube for releasably locking the second and third tubes in an extended position, the second tube having an opening in the upper end thereof through which the second locking means extends when the second and third tubes are in the extended position, the release bar assembly including a first bar extending between the first tube of each of the tube assemblies and secured thereto and a second bar extending between the first tube of each of the tube assemblies and slidably mounted thereon, the second bar being movable toward the first bar and having lock-engaging portions engageable with the first locking means of the tube assemblies as the second bar moves toward the first bar whereby each of the first locking means can be pushed inwardly through the opening in the first tube to release the first and second tubes and the second tube can telescope within the first tube, the first bar having lock-engaging portions engageable with the second locking means of the tube assemblies as the second tubes telescope within the first tubes whereby each of the second locking means can be pushed inwardly through the openings in the second tubes to release the second and third tubes and the third tubes can telescope within the second tubes.

6. The structure of claim 5 in which each of the locking means includes a rounded button and spring means for resiliently biasing the button outwardly.

7. The structure of claim 5 in which each of the lock-engaging portions of the second bar includes a cam surface for camming the first lock means inwardly.

8. The structure of claim 5 in which each of the lock-engaging portions of the first and second bars includes a cam surface for camming the associated lock means inwardly.

9. The structure of claim 5 including a guide rod secured to the first bar and extending toward the second bar, the rod being slidably received by the second bar, the second bar being movable along the guide rod as the second bar moves toward and away from the first bar.

10. The structure of claim 5 in which the upper end of each of the first tubes includes an inwardly extending rib on the inner surface thereof and the lower end of each of the second tubes includes an outwardly extending rib on the outer surface thereof, the ribs of the first and second tubes being engageable to prevent withdrawal of the second tube from the first tube, the upper end of each of the second tubes including an inwardly extending rib on the inner surface thereof and the lower end of each of the third tubes including an outwardly extending rib on the outer surface thereof, the ribs of the second and third tubes being engageable to prevent withdrawal of the third tube from the second tube.

* * * * *